United States Patent Office 2,921,058
Patented Jan. 12, 1960

2,921,058

POLYMERIZATION PROCESS

Morris Feller, Park Forest, and Edmund Field, Chicago, Ill., assignors to Standard Oil Company, Chicago, Ill., a corporation of Indiana No Drawing. Application October 11, 1954
Serial No. 461,648

14 Claims. (Cl. 260—94.9)

This invention relates to a novel polymerization process and to novel polymerization products produced thereby. In a more specific aspect, this invention relates to a novel process for the polymerization of ethylene, propylene or their mixtures in the presence of a metal selected from the class consisting of actinides and lanthanides and of a solid catalytic material containing an oxide of a metal of Group 5a or Group 6a (lefthand subgroup of Group 6) of the Mendeléeff Periodic Table, viz. one or more of the oxides of Cr, Mo, W or U.

One object of our invention is to provide novel and highly useful catalytic mixtures for the preparation of high molecular weight polymers from ethylene-containing gas mixtures. Another object is to provide a process of ethylene polymerization in which the yields of solid polymer are greatly increased, as compared with the yields heretofore obtainable solely by the use of subhexavalent oxides of Group 6a metals. Another object is to provide a novel process for the polymerization of ethylene to high molecular weight normally solid polymers. Still another object of our invention is to provide a novel process for the conversion of gas mixtures comprising essentially ethylene to high molecular weight solid resinous or plastic materials.

A further object is to provide a relatively low temperature, low pressure process for the conversion of ethylene-containing gases to high molecular weight resinous or plastic materials. An additional object of the present invention is to provide a process for the copolymerization of ethylene with other polymerizable materials, particularly with a normally gaseous mono-olefin such as propylene, to provide novel resinous materials. These and other objects of our invention will become apparent from the ensuing description thereof.

Briefly, the inventive process comprises the conversion of ethylene principally to high molecular weight normally solid polymers by contact with a mixture of a metal selected from the class consisting of actinides and lanthanides and one or more of the oxides of vanadium, chromium, molybdenum, tungsten or uranium; for example, a partially reduced molybdenum trioxide extended upon a support.

The lanthanides and actinides are metallic elements of the two so-called inner transition series of the periodic system and markedly resemble each other in chemical properties as a consequence of basic similarities in electron arrangements in the atoms (Therald Moeller, "Inorganic Chemistry," John Wiley & Sons, Inc., New York, pp. 891+ (1952)). The lanthanides or rare earth metals have atomic numbers in the range of 57–71, inclusive. The actinides have atomic numbers ranging upwardly from 89. Elements having atomic numbers in the range of 89–92, inclusive, are the so-called uranic actinides and those elements having atomic numbers of 93 or more are the trans-uranic actinides. From the standpoint of current practical importance, probably the most important metals of both inner transition series are La, Ce, Nd, Th, U and Pu. The lanthanides and actinides are preferably employed, in our invention, in a form in which there is a relatively high ratio of surface area to weight, in order to maximize their efficiency, e.g. in the form of powder or porous pellets, turnings, chips, wires, sponge, gauze, on porous supports, etc.

The inventive process is effected at temperatures between about 75° C. and about 325° C., preferably between about 130° C. and 260° C., and pressures between about atmospheric and 15,000 p.s.i.g. or higher, preferably between about 200 and 5000, or about 1000 p.s.i.g. The normally solid materials produced by the catalytic conversion tend to accumulate upon and within the solid catalyst. It is desirable to supply to the reaction zone a liquid medium which serves both as a reaction medium and a solvent for the solid reaction products. Suitable liquid reaction media for ethylene polymerization include various hydrocarbons, particularly an aromatic hydrocarbon such as benzene, toluene or xylenes. For the polymerization of propylene, less readily alkylatable reaction media such as cycloparaffins, e.g., cyclohexane or Decalin, or paraffins, e.g., iso-octane, are preferred. However, the conversion of ethylene- or propylene-containing gas streams can be effected in the absence of a liquid reaction medium or solvent and the catalyst containing accumulated solid polymeric conversion products can be treated from time to time, within or outside the conversion zone, to effect removal of conversion products therefrom and, if necessary, reactivation or regeneration of the catalyst for further use.

The practice of the process of the present invention can be employed to prepare ethylene homopolymers. Propylene polymers and ethylene-propylene co-polymers of widely variant molecular weight ranges and attendant physical and mechanical properties, dependent upon the selection of operation conditions, may also be made by the use of the novel catalytic mixtures herein described. The ethylene feed stock may contain other polymerizable materials, including mono-olefinic hydrocarbons such as n-butylenes, isobutylene, t-butylethylene, and the like, usually in proportions between about 1 and about 25% by weight, based on the weight of ethylene.

The inventive process is characterized by extreme flexibility both as regards operating conditions and as regards the products producible thereby. Thus the present process can be effected over extremely broad ranges of temperature and pressure. The practice of the present process can lead to grease-like ethylene homopolymers having an approximate molecular weight range of 300 to 700, wax-like ethylene homopolymers having an approximate specific viscosity ($\times 10^5$) between about 1000 and 10,000 and tough, resinous ethylene homopolymers having an approximate specific viscosity ($\times 10^5$) of 10,000 to more than 300,000 [($\eta$ relative $-1$)$\times 10^5$]. By the term "tough, resinous polyethylene" as used in the present specification and claims, we mean polymer having a brittle point below $-50°$ C. (A.S.T.M. Method D746–51T), impact strength greater than two foot pounds per inch of notch (A.S.T.M. Method D256–47T, Izod machine), and minimum elongation at room temperature (25° C.) of 100%.

An important feature of the present invention is the conjoint employment of a Group 5a or 6a metal oxide catalyst and an actinide or lanthanide. We may employ mixtures of the various lanthanides, since complete separation of these metals from each other is expensive. We may also employ mixtures of actinides or mixtures containing both actinides and lanthanides. In the presence of actinides or lanthanides and a Group 5a or 6a metal oxide catalyst, high yields of solid polymers can be obtained from ethylene, the metal oxide catalyst can function well in the presence of large proportions of liquid reaction medium, the metal oxide catalyst retains strong polymerization activity for a long period of time (long catalyst life), polymers having desirable ranges of physical and chemical properties can be readily produced by controlling the reaction variables, etc., as will appear from the detailed description and operating examples which follow. Another surprising and unexpected effect is that ethylene can be converted to normally solid polymers by contacting it with actinide or lanthanide metal and a solid oxide catalyst in which the Group 6a metal is initially present in the form of a trioxide rather than as a subhexavalent Group 6a metal oxide, which is esssential when no actinide or lanthanide is employed in the reaction zone.

The proportion of lanthanide or actinide promoter can be varied from about 0.005 to about 2 parts by weight, more often about 0.5 to about 1 part by weight, per part by weight of the metal oxide catalyst (total weight of solid catalyst). The optimum proportions can readily be determined in specific instances, by simple small-scale tests with the specific feed stocks, liquid reaction medium, reaction medium:catalyst ratio, catalyst, temperature, pressure and nature of the product which is desired.

The relative proportions of support and group 5a or 6a catalytic metal oxide are not critical and may be varied throughout a relatively wide range such that each component is present in amounts of at least approximately 1 weight percent. The usual catalytic metal oxide-support ratios are in the range of about 1:20 to 1:1, or approximately 1:10. We employ conditioned alumina-metal oxide catalysts composed of gamma-alumina base containing about 1 to 80%, preferably about 5 to 35%, or approximately 10%, of catalytic metal oxide supported thereon.

In the presence of lanthanides or actinides, the group 5a or 6a metal oxide catalysts can be supported on a wide variety of conventional catalyst supports, such as alumina, titania, zirconia, silica gel, kieselguhr, diatomite, acidic silica-aluminas, aluminosilicates, such as various clays and bleaching earths; and even adsorptive carbon, which is however not preferred. In a practical process, it is preferable to furnish a difficulty reducible metal oxide support for the group 6a metal oxide catalyst, e.g. gamma-alumina.

Gamma-alumina, titania and zirconia supports for our catalysts may be prepared in any known manner and the oxides of molybdenum or other group 6a metal may likewise be incorporated in, or deposited on, the support in any known manner, e.g. as described in U.S. Patents 2,692,257 of Alex Zletz and 2,692,258 of Alan K. Roebuck and Alex Zletz, both issued on October 19, 1954. We may employ molybdenum-alumina, chromia-alumina and tungstia-alumina catalysts of the type heretofore employed for effecting hydroforming, the word "hydroforming" being employed to mean processes of the type described in U.S. Letters Patent 2,320,147, 2,388,536, 2,357,332, etc.

The molybdena or other molybdenum-oxygen compound, such as cobalt molybdate, may be incorporated in the catalyst base in any known manner, e.g. by impregnation, coprecipitation, co-gelling, and/or absorption, and the catalyst base and/or finished catalyst may be heat-stabilized in the known manners heretofore employed in the preparation of hydroforming or hydrofining catalysts. Cobalt molybdate catalysts may be prepared as described in U.S. 2,393,288, 2,486,361, etc. Cobalt, calcium, nickel and copper salts of chromic, tungstic and uranic acids may also be employed, with or without a support.

The catalyst may be stablized with silica (U.S. 2,437,-532–3) or with aluminum ortho-phosphate (U.S. 2,440,-236 and 2,441,297) or other known stabilizers or modifiers. The catalyst may contain calcium oxide (U.S. 2,422,172 and 2,447,043) or the base may be in the form of a zinc aluminate spinel (U.S. 2,447,016) and it may contain appreciable amounts oif zirconia or titania (U.S. 2,437,531–2). Oxides of other metals such as magnesium, nickel, zinc, thorium, iron, etc., may be present in minor amounts, below 10 weight percent of the total catalyst.

Although, as stated above, no reducing treatment need be effected on the metal oxide catalysts when they are employed in the presence of lanthanides or actinides, a reducing or conditioning treatment is preferred in commercial processing. The conditioning or reducing treatment of the hexavalent group 6a metal oxide or of the group 5a metal oxide is preferably effected with hydrogen although other reducing agents such as carbon monoxide, mixtures of hydrogen and carbon monoxide (water gas, synthesis gas, etc.), sulfur dioxide, hydrogen sulfide, dehydrogenatable hydrocarbons, etc., may be employed. Hydrogen can be employed as a reducing agent at temperatures between about 350° C. and about 850° C., although it is more often employed at temperatures within the range of 450° C. to 650° C. The hydrogen partial pressure in the reduction or conditioning operation may be varied from subatmospheric pressures, for example even 0.1 pound (absolute) to relatively high pressures up to 3000 p.s.i.g., or even more. The simplest reducing operation may be effected with hydrogen at about atmospheric pressure.

The partial reduction of the metal oxide catalyst in which the metal is present in its hexavalent state can be effected in the presence of the lanthanide or actinide, prior to contacting the combination of catalyst with ethylene. We have at times observed that an induction period before ethylene polymerization can be eliminated or substantially reduced by pressuring hydrogen into the reactor containing the solvent, ethylene, metal oxide catalyst and promoter metals, e.g. at hydrogen pressures between about 10 and about 900 p.s.i.g., preferably 100–400 p.s.i.g.; under these conditions a small proportion of the ethylene is reduced to ethane.

The conditioning and reducing of the group 6a metal oxide can be followed and controlled by analysis with ceric sulfate-sulfuric acid solution, by means of which the average valence state of the molybdenum or other metal oxide in the catalyst can be accurately determined. In determining the average valence state of metals such as molybdenum in catalysts such as partially reduced $MoO_3$ supported on difficultly reducible metal oxides such as gamma-alumina, it is necessary to know the total molybdenum content and the number of milliequivalents of a standard oxidation reagent required to reoxidize the partially reduced molybdena to $MoO_3$. A suitable oxidation procedure consists in weighing out approximately one gram of finely-ground freshly-reduced catalyst into a glass-stoppered 250-ml. Erlenmeyer flask and adding 25 ml. of 0.1 N ceric sulfate solution and 25 ml. of 1:1 sulfuric acid. This mixture is allowed to stand at room temperature for four days with frequent agitation. This interval was arbitrarily chosen initially but was later shown to be more than sufficient time for the oxidation to take place. The solid residue is then filtered off and the excess ceric solution determined by addition of excess standard ferrous solution which is in turn titrated with standard ceric solution using ferrous-orthophenanthroline as the indicator. Total molybdenum in the sample is determined by dissolving the sample in a sulfuric acid-phosphoric acid solution, reducing the molybdenum in a Jones reductor, catching the reduced solution in ferric alum, and titrating the resulting ferrous ion with standard ceric sulfate solution. From the values obtained, the oxidation state of molybdenum can be determined.

The partial reduction of the molybdena or other group 6a metal trioxide is carried out to the extent that the average valence state of the catalytic metal in the catalyst lies within the range of about 5.5 to about 2, preferably between about 3.0 and about 5.0.

The conditioning treatment hereinabove described is required not only for fresh catalyst, but is also required for catalyst which has become relatively inactive in the polymerization step. As will be hereinafter described, the polymer formed in the polymerization reaction must be continuously or intermittently removed from the catalyst particles, preferably by means of solvents, and it is usually necessary or desirable to condition a catalyst surface which has been thus freed to some extent from polymer before it is again employed for effecting polymerization. When catalyst can no longer be rendered sufficiently active by simple removal of polymer and conditioning with a reducing gas as hereinabove described, it may be regenerated by extraction with water, ammonium salts or dilute aqueous acids, thereafter burning combustible deposits therefrom with oxygen followed by the conditioning step. Detoxification of the catalysts by treatment with dilute aqueous solutions of per-acids such as permolybdic, pervanadic or pertungstic acids may be practiced, followed by hydrogen-conditioning of the catalysts.

The catalysts can be employed in various forms and sizes, e.g., as powder, granules, microspheres, broken filter cake, lumps, or shaped pellets. A convenient form in which the catalysts may be employed is as granules of about 20–100 mesh/inch size range.

The charging stock to the present polymerization process preferably comprises essentially ethylene. The ethylene charging stocks may contain hydrogen and hydrocarbons, as in refinery gas streams, for example, methane, ethane, propane, etc. However, it is preferred to employ as pure and concentrated ethylene charging stocks as it is possible to obtain. When the charging stock contains propylene as well as ethylene, both these olefins may contribute to the production of resinous high molecular weight products.

It is desirable to minimize or avoid the introduction of oxygen, carbon dioxide, water or sulfur compounds into contact with the catalyst.

In general, polymerization can be effected in the present process at temperatures between about 75° C. and about 325° C. Usually polymerization is effected in the present process at temperatures between about 110° C. and about 275° C. or the preferred narrower range of about 220 to about 260° C. The conjoint use of polymerization temperatures between about 230 and about 260° C. and a liquid hydrocarbon reaction medium such as benzene, xylenes, Decalin or methyl Decalins is highly desirable in producing ethylene polymers having specific viscosities ($\times 10^5$) ranging on the average from about 10,000 to about 30,000 in continuous operations with relatively long on-stream periods and active catalysts.

The present process can be employed for the production of polymers at relatively low pressures. The process of the present invention can be effected to some extent even at atmospheric pressure. The upper limit of the partial pressure of ethylene in the process is dictated by economic considerations and equipment limitations and may be 10,000 p.s.i.g., 20,000 p.s.i.g., or even more. A generally useful and economically desirable ethylene pressure range is between about 200 and about 5000 p.s.i.g., preferably between about 500 and about 1500 p.s.i.g., e.g. about 1000 p.s.i.g.

The contact time or space velocity employed in the polymerization process will be selected with reference to the other process variables, catalysts, the specific type of product desired and the extent of ethylene conversion desired in any given run or pass over the catalyst. In general, this variable is readily adjustable to obtain the desired results. In operations in which the ethylene charging stock is caused to flow continuously into and out of contact with the solid catalyst, suitable liquid hourly spaced velocities are usually between about 0.1 and about 10 volumes, preferably about 0.5 to 5 or about 2 volumes of ethylene solution in a liquid reaction medium, which is usually an aromatic hydrocarbon such as benzene, xylenes or tetralin, or a cycloaliphatic hydrocarbon, such as Decalin (decahydronaphthalene). The amount of ethylene in such solutions may be in the range of about 2 to 50% by weight, preferably about 2 to about 10 weight percent or, for example, about 5 to 10 weight percent. When the ethylene concentration in the liquid reaction medium is decreased below about 2 weight percent, the molecular weight and melt viscosity of the polymeric products tend to drop sharply. The rate of ethylene polymerization tends to increase with increasing concentration of the ethylene in the liquid reaction medium. However, the rate of ethylene polymerization to form high molecular weight, normally solid polymers must not be such as to yield said solid polymers in quantities which substantially exceed the solubility thereof in said liquid reaction medium under the reaction conditions, usually up to about 5–7 weight percent, exclusive of the amounts of polymeric products which are selectively adsorbed by the catalyst. Although ethylene concentrations above 10 weight percent in the liquid reaction medium may be used, solutions of ethylene polymer above 5–10% in the reaction medium become very viscous and difficult to handle and severe cracking or spalling of the solid metal oxide catalyst particles or fragments may occur, resulting in catalyst carry-over as fines with the solution of polymerization products and extensive loss of catalyst from the reactor.

In batch operations, operating periods of between about one-half and about 50 hours, usually between about 1 and about 25 hours, are employed and the reaction autoclave is charged with ethylene as the pressure falls as a result of the ethylene conversion reaction.

The solvent:catalyst weight ratio can be varied in the range of about 5 to about 3000, or even higher for flow systems. The employment of very high solvent:catalyst ratios, which is rendered possible by the presence of promoter metal in the reaction zone, is very important in obtaining high yields of polymer.

Ethylene can be polymerized in the gas phase and in the absence of a liquid reaction medium by contact with the catalysts of our invention. Upon completion of the desired polymerization reaction it is then possible to treat the solid catalysts for the recovery of the solid polymerization products, for example by extraction with suitable solvents. However, in the interests of obtaining increased rates of ethylene conversion and of continuously removing solid conversion products from the catalysts, it is desirable to effect the conversion of ethylene in the presence of suitable liquid reaction media. The liquid reaction medium may also be employed as a means of contacting the ethylene with catalyst by preparing a solution of ethylene in the liquid reaction medium and contacting the resultant solution with the polymerization catalyst.

The liquid reaction medium functions as a solvent to remove some of the normally solid product from the catalyst surface.

Various classes of hydrocarbons or their mixtures which are liquid and substantially inert under the polymerization reaction conditions of the present process can be employed. Members of the aromatic hydrocarbon series, particularly the mononuclear aromatic hydrocarbons, viz., benzene, toluene, xylenes, mesitylene and xylene-p-cymene mixtures can be employed. Tetrahydronaphthalene also can be employed. In addition, we may employ such aromatic hydrocarbons as ethylbenzene, isopropylbenzene, n-propylbenzene, sec-butylbenzene, t-butylbenzene, ethyltoluenes, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations as distillates or bottoms, from cycle stock fractions of cracking operations, etc.

We may also employ certain alkyl naphthalenes which are liquid under the polymerization reaction conditions, for example, 1-methylnaphthalene, 2-isopropynaphthalene, 1-n-amylnaphthalene and the like, or commercially produced fractions containing these hydrocarbons.

Certain classes of aliphatic hydrocarbons can also be employed as a liquid hydrocarbon reaction medium in the present process. Thus, we may employ various saturated hydrocarbons (alkanes and cycloalkanes) which are liquid under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-pentane, n-hexane, 2,3-dimethylbutane, n-octane, iso-octane (2,2,4-trimethylpentane), n-decane, n-dodecane, cyclohexane, methylcyclohexane, dimethylcyclopentane, ethylcyclohexane, Decalin, methyldecalins, dimethyldecalins and the like.

We may also employ a liquid hydrocarbon reaction medium comprising liquid olefins, e.g., n-hexenes, cyclohexene, 1-octene, hexadecenes and the like.

The normally solid polymerization products which are retained on the catalyst surface or grease-like ethylene polymers may themselves function to some extent as a liquefied hydrocarbon reaction medium, but it is highly desirable to add a viscosity reducing hydrocarbon, such as those mentioned above, thereto in the reaction zone.

The liquid hydrocarbon reaction medium should be freed of poisons by acid treatment, e.g., with anhydrous p-toluenesulfonic acid, sulfuric acid, or by equivalent treatments, for example with aluminum halides or other Friedel-Crafts catalysts, maleic anhydride, calcium, calcium hydride, sodium or other alkali metals, alkali metal hydrides, lithium aluminum hydride, hydrogen and hydrogenation catalysts (hydrofining), filtration through a column of copper grains or 8th group metal, etc., or by combinations of such treatments.

We have purified C.P. xylenes by refluxing with a mixture of $MoO_3$—$Al_2O_3$ catalyst and $LiAlH_4$ (50 cc. xylene, 1 g. catalyst, 0.2 g. $LiAlH_4$) at atmospheric pressure, followed by distillation of the xylenes. Still more effective purification of solvent can be achieved by heating it to about 225–250° C. with either sodium and hydrogen or NaH in a pressure vessel.

Temperature control during the course of the ethylene conversion process can be readily accomplished owing to the presence in the reaction zone of a large liquid mass having relatively high heat capacity. The liquid hydrocarbon reaction medium can be cooled by heat exchange inside or outside the reaction zone. It should be noted, however, that in some instances the solvent may be present as a dense gas phase.

When solvents such as xylenes are employed, some alkylation thereof by ethylene can occur under the reaction conditions. Propylene is a far more reactive alkylating agent than ethylene and when propylene is present in the feed it is desirable to employ a non-alkylatable solvent such as Decalin. The alkylate is removed with grease in the present process, can be separated therefrom by fractional distillation and can, if desired, be returned to the polymerization zone.

In large scale, continuous polymerization operations we may employ essentially the method described and illustrated in our United States Patent 2,691,647, issued on October 12, 1954.

The following examples are presented for the purpose of illustrating but not unduly limiting the claimed invention. The general procedure which was employed was as follows. The catalyst was 20–80 mesh, 8 weight percent $MoO_3$ supported on gamma-alumina. The molybdena catalyst was pre-reduced unless otherwise indicated. Pre-reduction of the molybdena catalyst was carried out with dry hydrogen passing at atmospheric pressure through the catalyst at approximately 5 liters per hour per 1–10 g. of catalyst for 16 hours at 480° C. The reactions were carried out in stainless steel pressure vessels having a capacity of either 250 cc. or 100 cc., provided with magnetically-operated stirring mechanism. The reactor was charged with the solvent and thereafter with the pre-reduced molybdena catalyst. When 100 cc. of solvent were employed, a 250 cc. autoclave was used. The gas space in the reactor was then blanketed with nitrogen. The promoter metal in particle form was then added to the reaction vessel, whereupon the head was fitted while maintaining a flow of nitrogen to keep the system free of air. When unreduced catalyst was charged to the reaction vessel in Example 4, it was simply poured in without the use of nitrogen. Residual air was flushed from the reaction vessel while pressure testing with hydrogen. The final component, ethylene, was charged to the reaction vessel after the latter had been heated to the reaction temperature. The magnetically driven stirrup-type stirrer was alternatively lifted and plunged down through the solution at a rate sufficient to keep the catalyst in suspension. Ethylene was introduced from time to time during the course of the run in order to maintain the reaction pressure. A minor hydrogen partial pressure of the order of about 100–200 p.s.i.g. may be superimposed on the ethylene pressure when the reaction fails to start readily. By plotting cumulative pressure drop against cumulative time, the progress of a pressure run can be followed. In many cases much higher yields might have been obtained, had provisions been made for the inclusion of a larger proportion of solvent in the reaction zone, since one of the reasons for run termination was jamming of the stirring mechanism due to the fact that the high molecular weight polymer was produced in the reaction zone in an amount exceeding its solubility in the liquid reaction medium under the reaction conditions.

Melt viscosities of the polymers were determined by the method of Dienes and Klemm, J. Appl. Phys. 17, 458–71 (1946).

The important effects of our lanthanide or actinide metal promoters will be appreciated by bearing the following information in mind. In runs carried out without any promoter, employing the general operating procedure above described, employing the 8 weight percent pre-reduced molybdena-gamma-alumina catalyst and a C.P. xylenes:catalyst ratio (ml./g.) of 5, only 0.5 g. per g. of catalyst of solid ethylene polymer were obtained at 230° C. and 1000 p.s.i.g. initial ethylene pressure.

*Example 1*

The reactor was charged with 100 cc. of purified toluene, 0.6 g. of lanthanum chips and 1 g. of the pre-reduced molybdena-alumina catalyst. The reactor contents were heated with stirring to 254° C. and ethylene was introduced to an initial partial pressure of 845 p.s.i. Reaction was continued for 5 hours with intermittent repressuring of ethylene into the reactor. The total ethylene pressure drop during the reaction period was 1865 p.s.i. The tough, solid polyethylenes and grease-like solid ethylene polymers were extracted from the residual catalyst by hot aromatic solvent. Cooling the extraction solvent to room temperature resulted in the precipitation of the tough polyethylenes which were filtered from the solution of grease-like solid polymers in the solvent. Solvent was evaporated from the residual solution of polymers leaving a residue of the grease-like solid polyethylenes. It was found that the reaction yielded 15.2 grams of normally solid, tough polymer of ethylene per gram of the molybdena-alumina catalyst and 2.3 grams per gram of catalyst of the grease-like polymers of ethylene. The Williams plasticity of the tough polymer was 36.2 and its melt viscosity was 1.5×10⁵ poises.

*Example 2*

The process of Example 1 is repeated but commercial cerium or misch metal is substituted in equal amount for the lanthanum chips of Example 1. The composition of the misch metal is approximately as follows by weight: Ce, 50; La, 25; Nd, 15, and other lanthanides, 10. The reaction mixture is worked up as before to separate a normally solid polymer.

*Example 3*

The reactor was charged with 100 cc. of purified toluene, 0.5 g. of powdered thorium and 1 g. of the pre-reduced molybdena catalyst. The contents of the reactor were heated with stirring to 300° C. and hydrogen was introduced to bring the pressure to 1090 p.s.i.g. for a holding time of one hour. The temperature of the reactor was then reduced to 250° C., hydrogen was withdrawn and ethylene was introduced to an initial partial pressure of 375 p.s.i. Reaction was continued for 22 hours at which time the reactor was so full of high molecular weight solid polymer that the stirring mechanism was jammed. The total pressure drop over the reaction period was 480 p.s.i. of ethylene. The reaction products were worked up as in Example 1. It was found that the reaction yielded a dense, high molecular weight polymer from ethylene in excellent yield. The reaction yielded 21.6 g. of tough polymer having a Williams plasticity of 61.5, density (24/4° C.) of 0.9606 and melt viscosity of $1.1 \times 10^6$ poises. In addition, solid grease-like polymers of ethylene and liquid alkyltoluenes were recovered in the amount of 2.7 grams.

*Example 4*

The molybdena-alumina catalyst was used without prior reduction in this operation. The reactor was charged with 50 cc. of purified toluene, 1 g. of uranium turnings and 1 g. of catalyst. The reactor contents were heated with stirring to 250° C. and hydrogen was introduced to a partial pressure of 200 p.s.i. to shorten the induction period. Ethylene was then added immediately to an initial partial pressure of 385 p.s.i. and additional ethylene was introduced into the reactor intermittently during the reaction period of 43 hours. The total ethylene pressure drop was 575 p.s.i. The reaction mixture was worked up as before to yield 0.8 g. per gram of the molybdena catalyst of a dense polymer of ethylene (0.965 g./cc. at 24/4° C.) and 1 gram per gram of catalyst of grease-like solid polyethylenes.

*Example 5*

A comparison of the results of the following operation with those of the previous example indicates that substantial benefits accrue to the present polymerization process if the group 6a metal oxide catalyst is pre-reduced before use. The reactor was charged with 100 cc. of purified toluene, 1 g. of uranium turnings and 1 g. of pre-reduced catalyst. The contents were heated with stirring to 250° C. and ethylene was introduced to an initial partial pressure of 590 p.s.i. Over the reaction period of 18.5 hours the ethylene pressure drop was 285 p.s.i. The reaction products were worked up as before to yield 7.3 g. of a tough, high molecular weight polymer having a density of 0.9621 g./cc. (24/4° C.), Williams plasticity of 34.7 and melt viscosity of $1.4 \times 10^5$ poises. In addition, grease-like solid polymers and liquid alkylation products of toluene were recovered in the amount of 1.0 g.

We may employ group 5a metal oxide catalysts in lieu of the group 6a metal oxides in our process, viz., oxides of vanadium, columbium and tantalum, the process remaining otherwise unchanged in all essential regards. An example illustrative of the use of a group 5a metal oxide catalyst is the following.

*Example 6*

The reactor was charged with 100 cc. of purified toluene, 1 g. of uranium chips and 1 g. of a catalyst consisting of 10 weight percent $V_2O_5$ supported upon silica gel which had been pre-reduced with hydrogen at 350° C. and atmospheric pressure for 16 hours. The contents of the reactor were heated with stirring to 251° C. and ethylene was then introduced to an initial partial pressure of 935 p.s.i. Over the reaction period of 18 hours, the total ethylene pressure drop was 325 p.s.i. The reaction products were worked up as before to yield 1.8 g. per gram of the vanadia catalyst of a solid polymer having a melt viscosity of $8.2 \times 10^4$ poises and 1.5 g. per gram of vanadia catalyst of grease-like solid polymer.

In lieu of or in aiddtion to the lanthanide or actinide promoters, we may employ the corresponding hydrides. Lanthanium, cerium, praseodymium and neodymium react exothermally with hydrogen to produce hydrides of indefinite composition, liberating heat in amounts comparable to heats of formation of alkali or alkaline earth metal hydrides. Thorium hydride and especially $UH_3$ are desirable promoters for use in our process. The hydrides may be employed in proportions hereinabove recommended for lanthanides and actinide metals.

The polymers produced by the process of this invention can be subjected to such after treatment as may be desired, to fit them for particular uses or to impart desired properties. Thus, the polymers can be extruded, mechanically milled, filmed or cast or converted to sponges or latices. Antioxidants, stabilizers, fillers, extenders, plasticizers, pigments, insecticides, fungicides, etc. can be incorporated in the polyethylenes and/or in by-product alkylates or "greases." The polyethylenes may be employed as coating materials, binders, etc. to an even wider extent than polyethylenes made by prior processes.

The polymers produced by the process of the present invention, especially the polymers having high specific viscosities, can be blended with the lower molecular weight polyethylenes to impart stiffness or flexibility or other desired properties thereto. The solid resinous products produced by the process of the present invention can, likewise, be blended in any desired proportions with hydrocarbon oils, waxes such as paraffin or petrolatum waxes, with ester waxes, with high molecular weight polybutylenes, and with other organic materials. Small proportions between about .01 and about 1 percent of the various polymers of ethylene produced by the process of the present invention can be dissolved or dispersed in hydrocarbon lubricating oils to increase V.I. and to decrease oil consumption when the compounded oils are employed in motors; larger amounts of polyethylenes may be compounded with oils of various kinds and for various purposes.

The products having a molecular weight of 50,000 or more produced by the present invention, can be employed in small proportions to substantially increase the viscosity of fluid liquid hydrocarbon oils and as gelling agents for such oils. The solution of about 1 gram of an ethylene polymer produced by this invention, having a specific viscosity $\times 10^5$ of about 50,000 in about one liter of xylenes at a temperature close to the boiling point produces an extremely viscous solution.

The polymers produced by the present process can be subjected to chemical modifying treatments, such as halogenation, halogenation followed by dehalogenation, sulfohalogenation, e.g., by treatment with sulfuryl chloride or mixtures of $SO_2$ and $Cl_2$, sulfonation, and other reactions to which hydrocarbons may be subjected.

Having thus described our invention, what we claim is:

1. In a process for the production of a normally solid hydrocarbon material, the steps which comprise contacting ethylene with a metal selected from the class consisting of La, Ce, Nd, Th and U of their mixtures and with an oxide of a metal selected from the class consisting of V, Cr and Mo at a reaction temperature between about 75° C. and about 325° C., and separating a normally solid hydrocarbon material thus produced.

2. In a process for the production of a normally solid hydrocarbon material, the steps which comprise contacting ethylene with a metal selected from the class consisting of La, Ce, Nd, Th and U and their mixtures and with an oxide of a metal selected from the class consisting of V, Cr and Mo in the presence of a liquid hydrocarbon reaction medium at a reaction temperature between about 75° C. and about 325° C., and separating a normally solid hydrocarbon material thus produced.

3. The process of claim 2 wherein said oxide is partially pre-reduced before use.

4. The process of claim 2 wherein said liquid hydrocarbon reaction medium is a saturated hydrocarbon.

5. The process of claim 2 wherein said liquid hydrocarbon reaction medium is a monocyclic aromatic hydrocarbon.

6. In a process for the production of a normally solid, resinous hydrocarbon material, the steps which comprise contacting ethylene in a concentration between about 2 weight percent and about 10 weight percent in a liquid hydrocarbon reaction medium with a metal selected from the class consisting of La, Ce, Nd, Th and U and their mixtures and with a minor proportion of an oxide of a metal selected from the class consisting of V, Cr and Mo supported upon a major proportion of a difficultly reducible metal oxide, at a reaction temperature between about 200° C. and about 300° C. and a reaction pressure of at least about 200 p.s.i.g., and separating a normally solid, resinous hydrocarbon material thus produced.

7. The process of claim 6 wherein said metal is lanthanum, the liquid reaction medium is an aromatic hydrocarbon, and the metal oxide is a pre-reduced molybdenum oxide.

8. The process of claim 6 wherein said metal is cerium, the liquid reaction medium is an aromatic hydrocarbon and the metal oxide is a pre-reduced molybdenum oxide supported by gamma-alumina.

9. The process of claim 6 wherein said metal is thorium, the liquid reaction medium is an aromatic hydrocarbon and the metal oxide is a pre-reduced molybdenum oxide supported by gamma-alumina.

10. The process of claim 6 wherein said metal is uranium, the liquid reaction medium is an aromatic hydrocarbon and the metal oxide is a pre-reduced molybdenum oxide supported by gamma-alumina.

11. A process for the preparation of a tough, resinous, normally solid polymer, which process comprises contacting ethylene in a concentration of at least about 2 weight percent but not more than about 10 weight percent in a liquid hydrocarbon reaction medium with a metal selected from the class consisting of La, Ce, Nd, Th and U and their mixtures and with a catalyst comprising a major proportion of a difficultly reducible metal oxide and a minor proportion of a partially pre-reduced molybdenum oxide having an average valence state between about 2 and about 5.5 at a reaction temperature between about 130° C. and about 260° C. and a reaction pressure of at least about 200, and separating a solid polymer thus produced.

12. The process of claim 11 wherein said liquid hydrocarbon reaction medium is benzene, said molybdenum oxide is supported upon gamma-alumina and the weight ratio of said metal to said catalyst comprising a partially pre-reduced molybdenum oxide is between about 0.005 and about 2.

13. In a process for the production of a normally solid hydrocarbon material, the steps which comprise contacting an olefin having from 2 to 3 carbon atoms, inclusive, per molecule with a metal selected from the class consisting of La, Ce, Nd, Th and U and their mixtures and with an oxide of a metal selected from the class consisting of V, Cr and Mo at a reaction temperature between about 75° C. and about 325° C., and separating a normally solid hydrocarbon material thus produced.

14. The process of claim 13 which comprises introducing a minor proportion of hydrogen based upon said olefin, before substantial polymerization of said olefin has been effected, in order to initiate rapid and substantial polymerization of said olefin.

References Cited in the file of this patent

UNITED STATES PATENTS

| | | |
|---|---|---|
| 2,337,191 | Greensfelder et al. | Dec. 21, 1943 |
| 2,666,756 | Boyd | Jan. 19, 1954 |
| 2,691,647 | Field et al. | Oct. 12, 1954 |
| 2,700,663 | Peters | Jan. 25, 1955 |
| 2,702,288 | Hoeksema | Feb. 15, 1955 |
| 2,710,850 | Seelig | June 14, 1955 |
| 2,725,374 | Mosher | Nov. 29, 1955 |
| 2,728,754 | Evering | Dec. 27, 1955 |
| 2,825,721 | Hogan et al. | Mar. 4, 1958 |

OTHER REFERENCES

"Inorganic Chemistry" (Moeller), published by John Wiley & Sons (New York), 1952 (page 894 relied on).

"A Comprehensive Treatise on Inorganic and Theoretical Chemistry" (Mellor), published by Longmans, Green and Company (London), 1925 (volume V), page 611 relied on.